United States Patent [19]

Erhardt

[11] Patent Number: 4,587,876
[45] Date of Patent: May 13, 1986

[54] SAW BLADE FOR PREPARING WOOD AND OTHER MATERIALS

[76] Inventor: Herbert Erhardt, Bergholz 134, 8531 Amlikon, Switzerland

[21] Appl. No.: 653,224
[22] PCT Filed: Jan. 12, 1984
[86] PCT No.: PCT/CH84/00006
§ 371 Date: Sep. 11, 1984
§ 102(e) Date: Sep. 11, 1984
[87] PCT Pub. No.: WO84/02676
PCT Pub. Date: Jul. 19, 1984

[30] Foreign Application Priority Data

Jan. 13, 1983 [CH] Switzerland ............................ 168/83

[51] Int. Cl.$^4$ .................... B27B 33/08; B27B 33/12
[52] U.S. Cl. ...................................... 83/839; 83/855; 83/835
[58] Field of Search .................. 83/835, 839, 855, 840, 83/841, 842, 843, 844, 845, 854, 836, 838

[56] References Cited

U.S. PATENT DOCUMENTS

| Re. 15,038 | 2/1921 | Culley . | |
|---|---|---|---|
| 239,098 | 3/1881 | Hill | 83/839 |
| 464,855 | 12/1891 | Clark | 83/835 |
| 481,201 | 8/1892 | Schlabach | 83/855 |
| 3,288,180 | 11/1966 | McLean et al. . | |
| 3,362,446 | 1/1968 | Potomak | 83/855 |
| 4,324,163 | 4/1982 | LaVelle | 83/855 |

FOREIGN PATENT DOCUMENTS

| 0040421 | 11/1981 | European Pat. Off. | 83/854 |
|---|---|---|---|
| 815840 | 10/1951 | Fed. Rep. of Germany . | |
| 1061058 | 4/1954 | France . | |
| 1403863 | 5/1965 | France . | |
| 226614 | 12/1924 | United Kingdom . | |
| 590282 | 7/1947 | United Kingdom . | |
| 2044171 | 10/1980 | United Kingdom | 83/835 |

OTHER PUBLICATIONS

Saws and Sawing Machinery by Eric N. Simons, p. 93 (1946), published by Pitman & Sons.

Primary Examiner—Donald R. Schran
Attorney, Agent, or Firm—Frishauf, Holtz, Goodman & Woodward

[57] ABSTRACT

The teeth of the saw blade (1) intended for preparing wood comprise a cutting edge (2) beginning at the tip (6) and forming an angle of intersection ($\delta$) of 40°–55°. Adjoining the cutting edge (2) at the tooth face there is a cut-back, circular curved section (3). This curved section (3) continues at the bottom into a rounded base (4) between adjacent teeth and then continues into the edge (5) bordering the gap between the teeth, and on into the back of the next tooth.

A considerably increased cutting performance is achieved with a saw blade of this kind, since a paring action is effected, and the shavings can roll away easily.

Saw blades equipped with this kind of teeth can be made both as circular saw blades and also as bandsaw blades which are moved in a straight line.

13 Claims, 7 Drawing Figures

SAW BLADE FOR PREPARING WOOD AND OTHER MATERIALS

The invention relates to a saw blade for preparing wood and other materials, wherein the teeth each have a cutting edge and a rounded base between the teeth.

BACKGROUND

Numerous ways of shaping the teeth of saws are already known, and these are variously designed according to the purpose for which they are intended and the materials to be sawn.

THE INVENTION

It is our object to create a saw blade with which a considerably higher cutting performance is possible than with conventional saw blades.

As tests have shown, the cutting performance of saw blades in accordance with the invention exceeds that of the usual commercially available saw blades by a surprising amount. This can be explained by the fact that a paring-action cutting process takes place, and the shavings can flow away unhindered. Even hardwoods which are difficult to work with can be sawn very much better with these saw blades than with conventional saw blades. The blade geometry produces adequately strong teeth, which do not tend to break off despite the relatively acute cutting angle. Moreover, the teeth may be reground many times.

Embodiment examples of the subject of the invention are shown on the Drawing.

Figure 1:
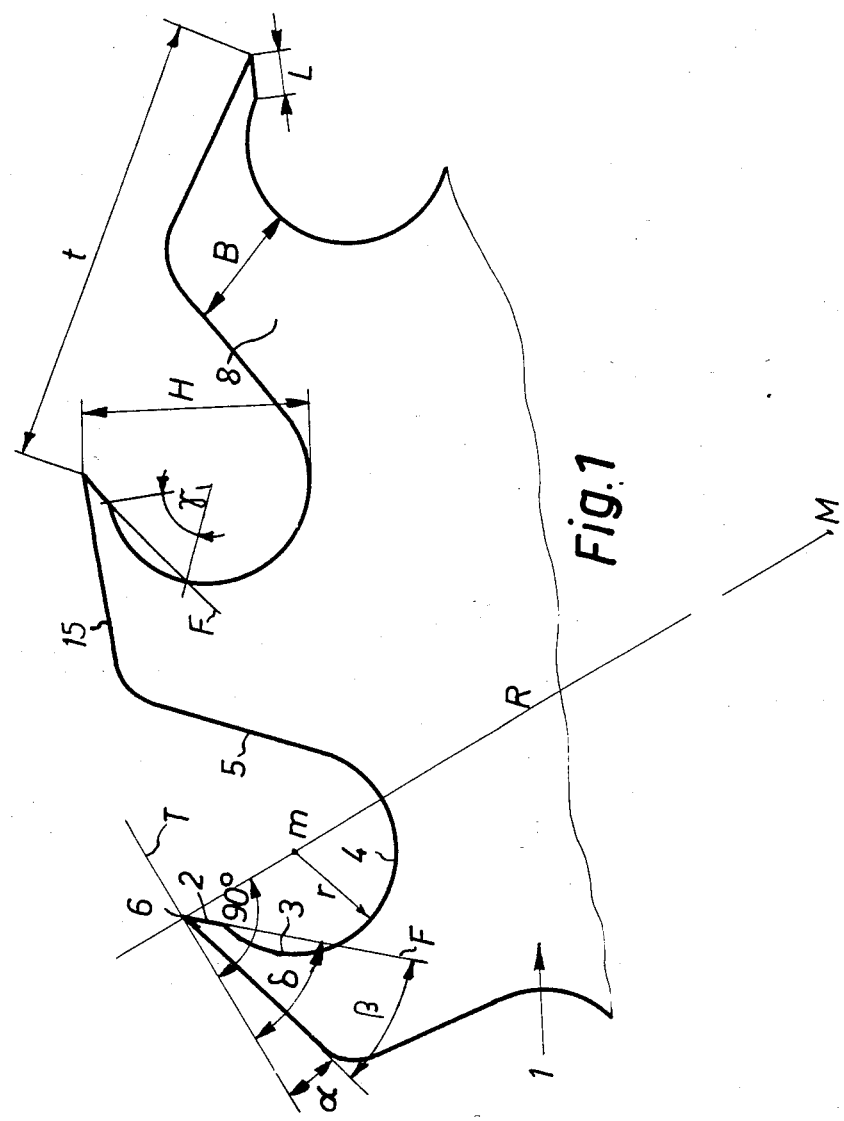
FIG. 1 is a partial view of a circular saw blade, showing the geometry of the teeth.

The circular saw blade shown in FIG. 1 has a diameter in the magnitude of approximately 50–1500 mm, and is used for preparing hard or soft wood and similar materials, such as laminated material made from wood. The teeth of a circular saw blade 1 of this kind have a shaping which differs from the conventional design. Each tooth comprises a face 2 and an adjoining curved section 3. This curved section 3 continues smoothly into the rounded base 4 between two teeth, and then continues on into the back 5 of an adjacent tooth, thus forming the space between two teeth. The curved section 3 is cut back relative to an imaginary straight line F drawn as a continuation of the face 2 and, together with the base 4 between the teeth, forms a circular curved section 3 with a radius r. The centre point m of this radius r is located at least approximately on a radius R plotted from the center point M of the circular saw blade to the cutting edge or tip 6 of the tooth. A tangent T drawn to the circumferential circle of the circular saw blade 1 and passing through the cutting edge 6 of the tooth (thus, extending at right-angles to the radius R) forms an angle of intersection $\delta$ of less than 60°, namely 45°–55°, and preferably approximately 45°–52°, with the face 2 and the straight line F. The length L of this face 2 corresponds to approximately $\frac{2}{3}$ of the tooth width or cutting width. The face 2 and the back part 15 which directly adjoins the cutting edge 6 of the tooth are straight in construction. The length L of the face 2 becomes greater as it is reground, and may then correspond to approximately twice the thickness of the tooth.

The cutting width amounts to approximtely 3 mm with a circular saw diameter of 200 mm and approximately 4 mm with a diameter of 500 mm, and is correspondingly graduated for intermediate width.

The clearance angle $\alpha$ amounts to 5°–18°, and preferably approximtely 15°. The radius r amounts in this instance to approximately $\frac{1}{4}$ of the pitch of the teeth. The curved section 3 which forms the cut-back section and the tooth base 4 run smoothly into one another and form part of a circle. The tooth depth H lies approximately in the magnitude of half the tooth pitch t. The sector angle $\gamma$ of the chord formed by the straight line F of the curved section 3 amounts to 60°–110°, and preferably approximately 80°. The sharpness angle $\beta$ amounts to 30°–55°, and preferably approximately 35°–40°.

The width B of the body 8 of the tooth between the face of the tooth and the back 5 of the tooth is greater at its narrowest point than the circle radius r.

This tooth shape and blade geometry result in a paring action when cutting the material and gives a particularly high cutting performance. The detected shavings have sufficient space to roll away (in the spaces between the teeth).

A similar tooth shaping can also be used for saw blades which are moved in a straight line or in reciprocating movement, that is, back and forth. This includes bandsaw blades, particularly muley bandsaw blades, gang saw blades and compass saw blades (also for back and forth movement), for preparing wood and similar materials, particularly laminated materials made from wood.

Figure 2:
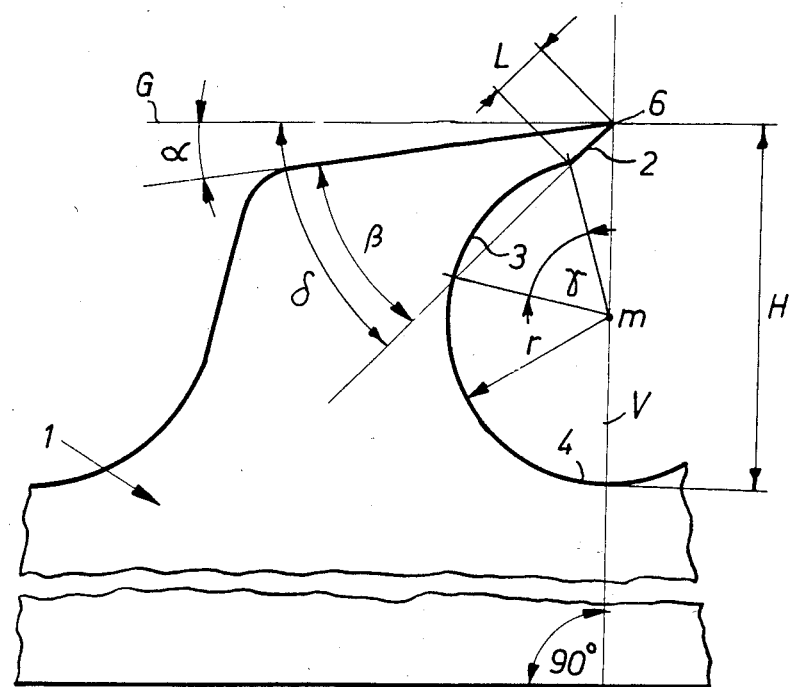
FIG. 2 shows a single tooth of a saw blade intended for movement in a straight line.

FIG. 2 shows the tooth shaping for a saw blade 1 which is moved thus, in a straight line. A line V extending at right-angles to the back 10 of the blade and plotted to the tip 6 of the tooth extends at least approximately through the centre point m of a circle with the radius r forming the curved section 3 and the base 4 between the teeth. The angle of intersection $\delta$ which is formed between a straight line G parallel with the back 10 of the blade and the cutting edge 2 is 40°–55°, and preferably approximately 48°–52°. The clearance angle $\alpha$ amounts in this case to 4°–15°, and preferably 5°–10°. The face 2 has a thickness amounting to approximately 1.25 mm to 1.8 mm. The length L of the cutting edge in such bandsaw blades amounts to H/6 to H/2, with H normally amounting to 18–22 mm.

Figure 3:
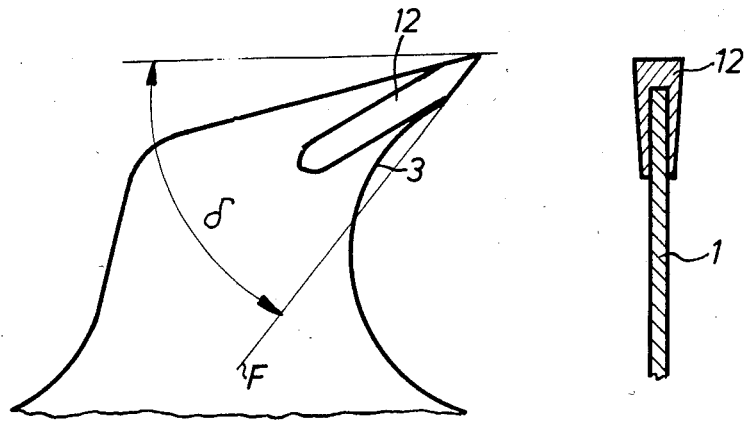
FIG. 3 is a view of a tooth with an inserted hard metal cutting edge.
Figure 4:
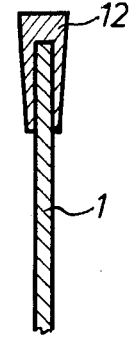
FIG. 4 is a section through the tooth fitted with a hard metal tip or cutting edge as shown in FIG. 3.

FIGS. 3 and 4 show a tooth fitted with a hard metal cutting edge which can be used for both circular saw blades and saw blades moved in a straight line. The small hard metal plate 12 is let into the saw blade material and is soldered to it. Preferably, the angle of intersection $\delta$ amounts in this case to 45°–50°. The centre line of the small hard metal plate extends approximately along the bisectrix of the angle of intersection.

Figure 6:
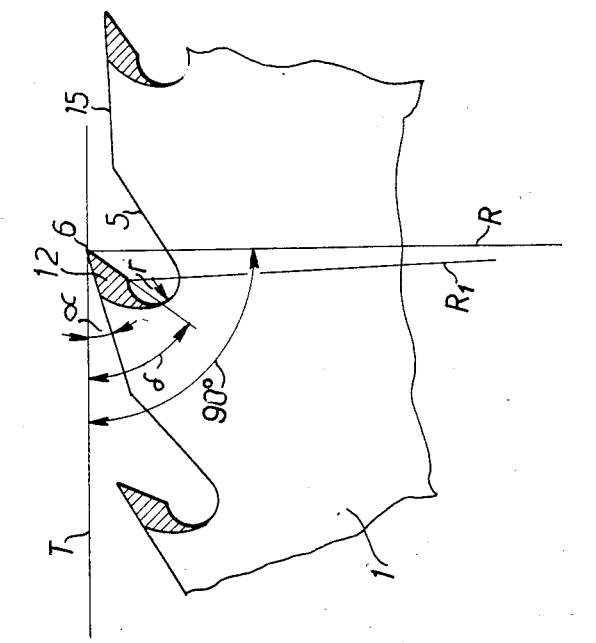
FIG. 6 shows a section of a circular saw blade wherein the teeth are fitted with a cast hard metal cutting edge or tip.
Figure 5:
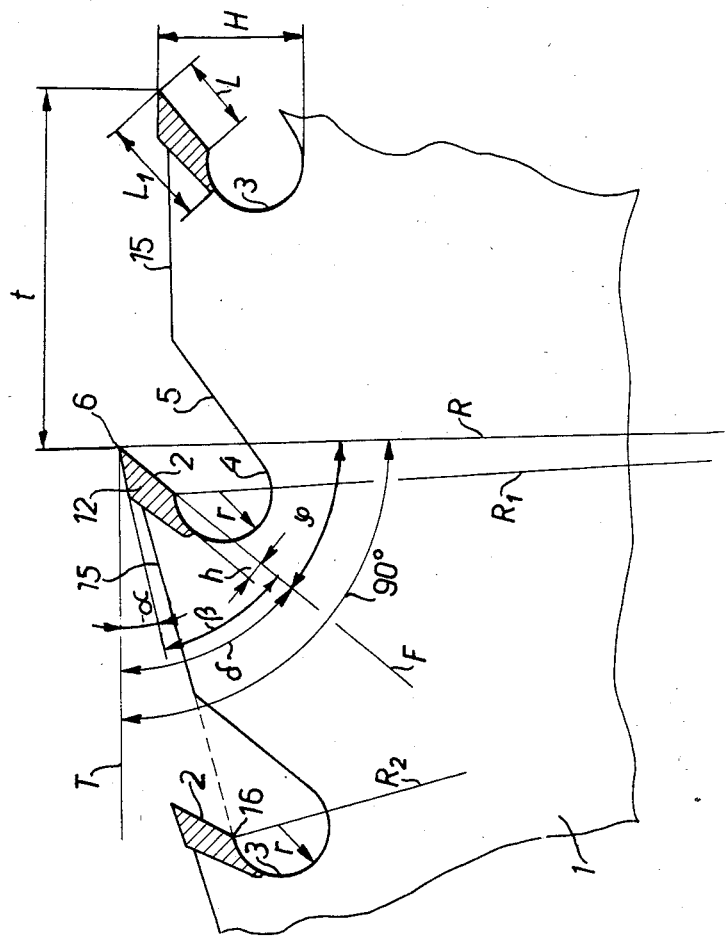
FIG. 5 shows a section of a circular saw blade wherein the teeth are fitted with a sintered hard metal insert.

FIGS. 5 and 6 show two further embodiments wherein the teeth are fitted with hard metal cutting edge inserts. In the embodiment of a circular saw blade shown in FIG. 5 soldered-in sintered hard metal inserts 12 are used. These are substantially in the shape of a parallelogram, but with one of the short sides curved concavely. The length $L_1$ measured over the tips amounts to approximately 9-14 mm and the distance measured between the long parallel surfaces amounts to approximately ¼ of the length. The radius r, which is a component of the circular curved section 3, amounts to approximately 4 mm with circular saw diameters of 200-500 mm, and approximately 8 mm with diameters of more than 500 mm. The sharpness angle β amounts to approximately 40°-45°. In the embodiment shown in FIG. 5 the face 2 is somewhat longer than that of the embodiment shown in FIG. 1. This length L amounts to approximately ⅓ to 3/5 of the depth H of the teeth. With circular saw diameters of 50-150 mm the tooth depth amounts to approximately 10-12 mm, while normally it amounts to approximately 12-22 mm. The centre point m of the curved section 3, which is again circular in this case, lies approximately on a radius $R_1$ which is plotted from the centre point of the circular saw to the inner end of the face 2. This corresponds to the point 16 at the transition between the straight face 2 and the arched curved section 3. The radius r corresponds to approximately ¼ of the depth of the teeth. The depth h of the cut-back of the curved section 3 lies approximately in the magnitude of ⅜ r. The amount of the cut-back may, however, also be expressed with reference to the sector angle γ shown in FIG. 1. The sector angle γ of the chord which the straight line F cuts out of the curved section 3 amounts here to 60°-110°, and preferably approximately 90°. The circular curved section 3 which adjoins the region of the hard metal insert 12 corresponds to approximately half the sector angle γ and forms part of the cut-back. The clearance angle α amounts to 5°-15°, the front rake ζ is approximately 38°-42° and the rake angle β amounts to 30°-55°, and preferably approximately 35°-47°. If the clearance angle α amounts to a minimum of 5° the sharpness angle β should amount to a minimum of 40° and a maximum of 55°; if, on the other hand, the clearance angle α amounts to a maximum of 15°, the sharpness angle β should amount to a minimum of 30° and a maximum of 45°. Corresponding graduation will provide the intermediate values. A straight line plotted along the back 15 strikes the point 16 on the next adjacent tooth at the transition between the face 2 and the curved section 3. The tooth gap surface 5 adjoining the back 15 forms an acute angle with the straight line F so that the shavings which have been detached can emerge unhindered from the shaving space. The curved section 3 and the tooth base 4 together form more than half of a circle, and preferably form an angle of approximately 120°.

In the embodiment shown in FIG. 6 the teeth are fitted with cast hard metal inserts which are known in particular under the Trade Name of "Stellite". The angle of intersection δ amounts to approximately 50°, the clearance angle α to approximately 15° and the front rake ζ to approximately 40°. In other respects, substantially the dimensions and relationships mentioned in connection with FIG. 5 apply.

Figure 7:
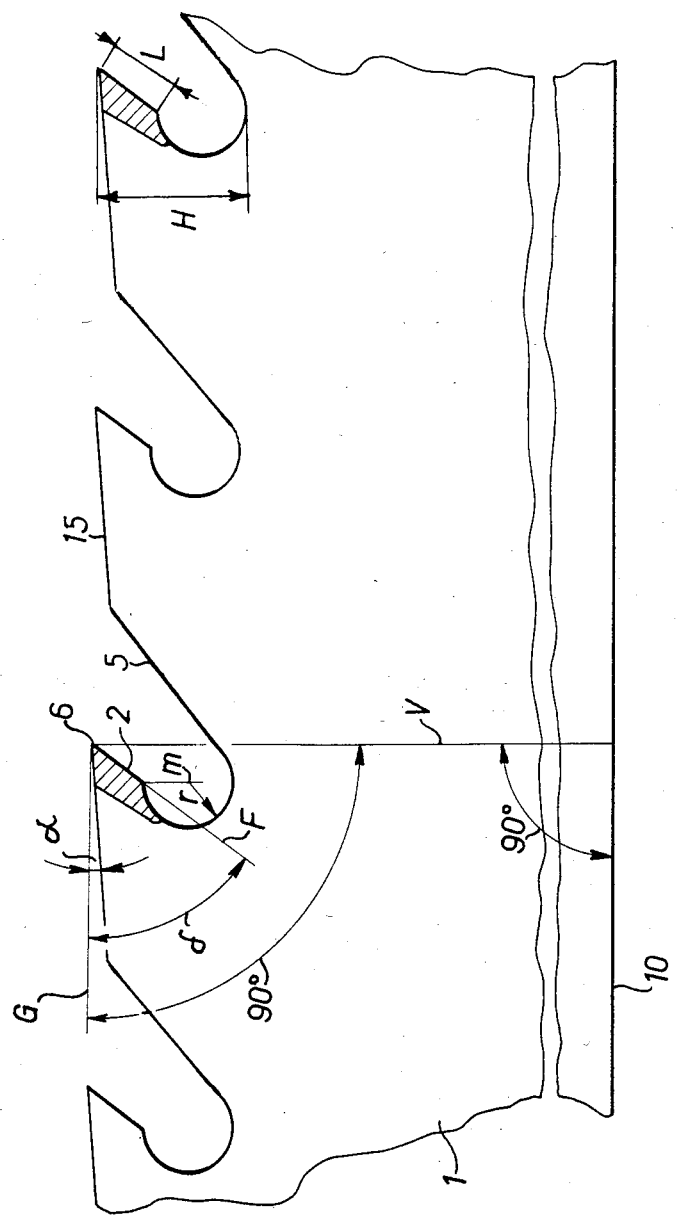
FIG. 7 shows a section of a saw blade intended for straight-line movement, wherein the teeth are fitted with a sintered hard metal cutting edge or tip.

FIG. 7 shows an embodiment of a bandsaw blade 1, thus, for movement in a straight line. Its teeth are fitted with cast hard metal inserts. The angle of intersection δ amounts to approximately 50°-52°, the clearance ζ angle α approximately 5°-15°, and the front rake approximately 38°-40°. The tooth depth H corresponds to approximately twice the length L of the cutting edge. The radius r amounts to approximately 1/7-1/8 of the pitch of the teeth. In rapidly operating bandsaws it is also possible to have a Stellite tip soldered into every second tooth only. The angle between the back 5 and the straight line F is an acute angle of approximately 22°-28°, and preferably approximately 25°. This shaving space, widening out towards the outside, facilitates the removal of the shavings.

The values and relationships indicated for the various embodiments may also be combined with one another, as long as they do not mutually exclude each other.

I claim:

1. A circular saw blade, particularly for cutting wood and the like material, having teeth,
   each teeth including a hard metal insert (12), forming the cutting edge and secured to a tooth body,
   the insert being characterized in that:
      the face (2) of the insert (12) has an angle of intersection (δ) of less than 60° but at least 40°, with respect to a tangent (T) to said cutting edge (6);
      the insert (12) is substantially in form of a parallelogram, with two long parallel straight sides and two short sides, the short side opposite to said cutting edge being formed with a concave, curved portion;
      and wherein the teeth are formed with a curved section (3) adjoining the concave curved portion of the insert, and continuing smoothly into the base (4) or root between the teeth.

2. Saw blade according to claim 1, wherein
   the face (2) forms an angle of intersection (δ) of 45°-52° with a tangent drawn to the cutting edge (6),
   the cutting angle (β) being 30°-45°; and
   the cut-back curved section (3) in the tooth being circular and having a common circle center point with the concave curved portion of the insert (12).

3. Saw blade according to claim 1, wherein
   the clearance angle (α) is about 10°-18°, relative to a tangent (T) at the outer circumference of the tooth, and passing through the cutting edge (6) of the tooth.

4. Saw blade according to claim 3, wherein said clearance angle (α) is approximtely 15°.

5. Saw blade according to claim 1, wherein a straight line plotted along the back of the tooth at the circumference of the blade passes through a transition point (16) between the face (2) and the curved section (3).

6. Saw blade according to claim 1, wherein the curved section (3) is circular, and has a circle center point (m) which is positioned on a radius ($R_1$) which extends through a transition point (16) located between the face (2) and the curved section (3).

7. Saw blade according to claim 1, wherein the curved portion is circular, and has a circle point (m) which is positioned on a radius ($R_1$) which extends through a transition point (16) located between the face (2) and the curved section (3).

8. Saw blade according to claim 6, wherein the curved portion is circular, and has a circle center point (m) which is positioned on a radius ($R_1$) which extends through a transition point (16) located between the face (2) and the curved section (3);
   and wherein said circle center point is common to the concave curved portion of the insert and said curved section (3).

9. Saw blade according to claim 1, wherein the curved section (3) has a radius (r) of approximately $\frac{1}{4}$ to $\frac{1}{2}$ of the depth (H) of the teeth.

10. Saw blade according to claim 1, wherein
the radius (r) of the curved section (3) is approximately $\frac{1}{4}$ of the depth (H) of the teeth, the length (L) of the face (2) is approximately half the depth (H) of the teeth; and the curved section (3) is circular and corresponds to about half the sector angle ($\gamma$) and forms part of a cutback.

11. For combination with a circular saw blade,
a hard metal insert for the teeth of the saw blade wherein said insert is formed substantially as a parallelogram with two straight parallel sides and two short sides, one of the short sides including a concave curved portion, and a cutting edge, said cutting edge being located at the other end of said long side.

12. The insert of claim 11, wherein, for a circular saw of diameter of less than 20 cm, the longer side of the parallelogram is approximately 4 mm long;

for circular saws of diameters of between 20 to 50 cm, the longer side is approximately 6 mm long; and for circular saws of greater than about 50 cm in diameter, the longer side of the parallelogram is about 8 mm long.

13. The insert of claim 11, wherein the curve of said curved portion is essentially circular, and has a radius (r) which is between about $\frac{1}{4}$ to $\frac{1}{2}$ of the depth (H) of teeth of the circular saw blade with which it is to be used.

* * * * *